United States Patent

Chen et al.

Patent Number: 5,332,522
Date of Patent: Jul. 26, 1994

[54] THERMOTROPIC CHIRAL NEMATIC LIQUID CRYSTALLINE COPOLYMERS

[75] Inventors: Shaw H. Chen, Penfield; John C. Mastrangelo, Frankfort; Hongqin Shi, Rochester, all of N.Y.; Sushil Krishnamurthy, Sunnyvale, Calif.

[73] Assignee: The University of Rochester, Rochester, N.Y.

[21] Appl. No.: 55,120

[22] Filed: Apr. 29, 1993

[51] Int. Cl.$^5$ .............. C09K 19/52; C09K 19/30; C09K 19/12; G02F 1/13

[52] U.S. Cl. .............. 252/299.01; 252/299.63; 252/299.64; 252/299.65; 252/299.66; 252/299.67; 428/1; 359/36

[58] Field of Search .............. 252/299.01; 428/1; 359/36, 301, 318

[56] References Cited

U.S. PATENT DOCUMENTS

| | | | |
|---|---|---|---|
| 4,293,435 | 10/1981 | Portugall et al. | 252/299.01 |
| 4,410,570 | 10/1983 | Kreuzer et al. | 252/299.01 |
| 4,743,675 | 5/1988 | Watanabe | 428/1 |

OTHER PUBLICATIONS

M. L. Tsai and S. H. Chen, *Macromolecules*, 1990, vol. 23, pp. 1908–1911.
S. H. Chen and M. L. Tsai, *Macromolecules*, 1990, vol. 23, pp. 5055–5058.
S. Krishnamurthy and S. H. Chen, *Macromolecules*, 1991, vol. 24, pp. 3481–3484.
S. Krishnamurthy and S. H. Chen, *Macromolecules*, 1992, vol. 25, pp. 4485–4489.
H. Finkelmann, *Angew. Chem. Int. Ed. Engl.* 1987, vol. 26, pp. 816–824.
S-T Wu et al., *J. Appl. Phys.*, 1990, vol. 68(1), pp. 78–85.
G. W. Gray et al., *J.C.S. Chem. Comm.*, 1974, pp. 431–432.
A. Boller et al., *Z. Naturforsch.*, 1978, vol. 33b, pp. 433–438.
J. L. Fergason, *Molecular Crystals*, 1966, vol. 1, pp. 293–307.
P. V. Adomenas et al., *Opt. Spectros. (USSR)*, 1983, vol. 54(2), pp. 179–182.

Primary Examiner—Shean Wu
Attorney, Agent, or Firm—M. Lukacher; L. Fleckenstein

[57] ABSTRACT

A thermotropic chiral nematic liquid crystalline copolymer composition comprises $$\text{\textdaggerdbl NEM\textdaggerdbl}_y\text{\textdaggerdbl NEM'\textdaggerdbl}_{y'}\text{\textdaggerdbl CHI\textdaggerdbl}_x \quad (I)$$

wherein —NEM— and —NEM'— are each independently nematogenic units of formula

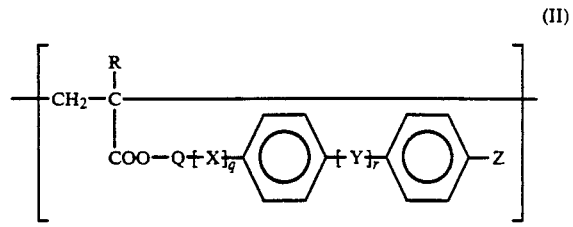

wherein R is H or CH$_3$,
—Q— is an alkylene radical having 1 to about 8 carbon atoms,
—X— is —O—, —S—, or —CH$_2$—,
—Y— is

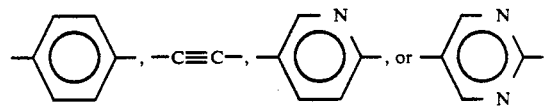

—Z is —CN, —NO$_2$ or —N=C=S,
q and r are each independently 0 or 1;
wherein —CHI— is a chiral unit of formula

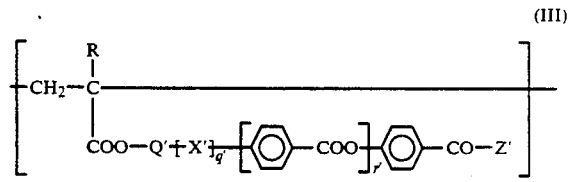

wherein R is H or CH$_3$,
—Q'— is an alkylene radical having 1 to about 8 carbon atoms,
—X'— is —O—, —S—, or —CH$_2$—,
—Z' is an alkoxy, aralkoxy, alkylamino, or aralkylamino radical having 4 to about 12 carbon atoms and containing at least one asymmetric carbon atom,
q' and r' are each independently 0 or 1;
and wherein x is the mole fraction of chiral units and (y+y') is the total mole fraction of nematogenic units in said copolymer composition, and the ratio of x to (y+y') is from about 1:50 to 1:1.

This compolymer composition is employed to form an optical device.

25 Claims, No Drawings

THERMOTROPIC CHIRAL NEMATIC LIQUID CRYSTALLINE COPOLYMERS

FIELD OF THE INVENTION

This invention relates to thermotropic chiral nematic liquid crystalline copolymer compositions, and more particularly to their use for forming optical devices that produce reflected light having broad band widths, and to processes for forming such devices.

BACKGROUND OF THE INVENTION

Liquid crystalline materials exhibiting the cholesteric mesophase have been proposed for use in a variety of optical applications, for example, notch filters, circular polarizing filters, selective reflectors, beam splitters, and beam apodizers. U.S. Pat. No. 3,711,181, for example, discloses an optical apparatus for modulating circular-polarized light that contains optically negative liquid crystal films.

It has been recognized that low molecular weight liquid crystal materials suffer limitations as to durability, effective temperature, mesophase stability, and amenability to processes for device fabrication. Polymeric liquid crystalline compositions have been proposed as potentially useful for overcoming such limitations. U.S. Pat. No. 4,293,435 discloses a liquid-crystalline cholesteric polymer phase that consists essentially of a copolymer of particular nematogenic and chiral acrylic ester monomers. In U.S. Pat. No. 4,410,570 is disclosed a liquid crystalline phase that contains a cyclic organopolysiloxane to which is chemically bonded at least one mesogenic group. Thermotropic cholesteric liquid crystalline glutamate copolymers consisting of chiral glutamate ester repeating units are disclosed in U.S. Pat. No. 4,743,675.

Many applications of chiral liquid crystalline polymeric materials in optical devices require polymers capable of forming both right- and left-handed helical structures. When a film of such a polymer is applied to a substrate, the helical structures must be capable of forming and maintaining the Grandjean texture, in which the helical axis is perpendicular to the substrate surface, to enable the selective reflection of circular-polarized light. An enantiomeric chiral pair of liquid crystalline polymers, whose individual structures are characterized as a right-handed and a left-handed helix, are thus capable of selectively reflecting right-handed and left-handed circular-polarized light, respectively.

Especially useful for optical information storage applications are chiral nematic liquid crystalline polymers which form clear, transparent films that absorb no light in the visible region but do selectively reflect visible circular-polarized light. It is especially desirable for the application of these films as high efficiency polarizers that the reflected light be characterized by a broad half band width (HBW), as defined by the width of the spectral band measured at one-half of its maximum height. In devising flat panel displays, for example, where electrical power requirements should be kept as low as possible, chiral nematic liquid crystalline copolymers that form films whose half band widths in the visible region are substantially broader than those known in the art would be extremely useful.

In addition to the just described optical characteristics, it is necessary that the chiral nematic polymers be readily synthesized and that they have solubility properties which enable their processing into clear glassy thin films for use as optical devices. All of these requirements are met by the chiral nematic liquid crystalline copolymer compositions of the present invention.

SUMMARY OF THE INVENTION

In accordance with the invention there is provided a thermotropic chiral nematic liquid crystalline copolymer composition

(I)

wherein —NEM— and —NEM'— are each independently nematogenic units of formula

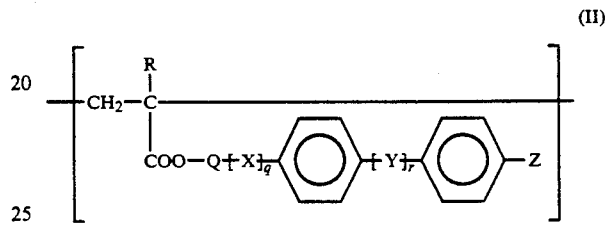

(II)

wherein R is H or CH$_3$,

—Q— is an alkylene radical having 1 to about 8 carbon atoms,

—X— is —O—, —S—, or —CH$_2$—,

—Y— is

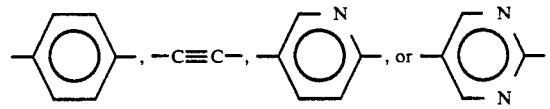

—Z is —CN, —NO$_2$, or —N=C=S, q and r are each independently 0 or 1;

wherein —CHI— is a chiral unit of formula

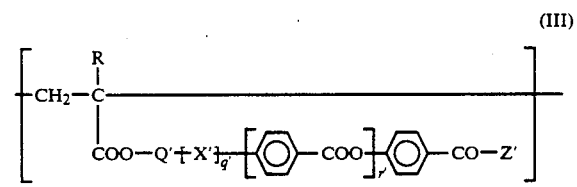

(III)

wherein R is H or CH$_3$,

—Q'— is an alkylene radical having 1 to about 8 carbon atoms,

—X'— is —O—, —S—, or —CH$_2$—,

—Z' is an alkoxy, aralkoxy, alkylamino, or aralkylamino radical having 4 to about 12 carbon atoms and containing at least one asymmetric carbon atom, q' and r' are each independently 0 or 1;

and wherein x is the mole fraction of chiral units and (y+y') is the total mole fraction of nematogenic units in said copolymer composition, and the ratio of x to (y+y') is from about 1:50 to 1:1.

The invention further provides an optical device formed from the above described copolymer composition.

DETAILED DESCRIPTION OF THE INVENTION

In accordance with the present invention, a thermotropic chiral nematic liquid crystalline copolymer composition is formed by the copolymerization of one or two monomeric nematogenic units and a monomeric chiral unit. The monomeric units are preferably alkyl acrylates or alkyl methacrylates, and the resulting copolymers have a weight average molecular weight of about 1,500 to 50,000, preferably about 2,000 to 20,000. The molar ratio of chiral units to total nematogenic units in the copolymer compositions is from about 1:50 to 1:1, preferably from about 1:20 to 1:3, and most preferably from about 1:15 to 1:6.

A monomeric nematogenic unit of formula (II) contains a mesogenic group, which imparts liquid crystalline characteristics to the unit and to copolymers formed from it. This mesogenic group, which typically has a rod-shaped molecular structure (Cf. H. Finkelmann, *Angew. Chem. Int. Ed. Engl.*, 1987, vol. 26, pp. 816–824), is attached to the acrylic or methacrylic carbonyloxy moiety by a flexible link —Q—, which is an alkylene radical having either a straight or branched chain and containing one to about eight, preferably about two to six, carbon atoms. To obtain a copolymer composition with high optical birefringence, it is desirable that the —Y— and —Z groups in the nematogenic units of formula (II) contain a multiplicity of conjugated unsaturated bonds; however, this conjugated unsaturation must not cause substantial absorption of light in the visible region by the copolymer composition. Useful mesogenic groups for the practice of the present invention include: biphenyl and diphenylacetylene moieties described in the aforementioned paper by Finkelmann and by Wu et al., *J. Appl. Phys.*, 1990, vol. 68, pp. 78–85; terphenyl groups described by Gray et al., *J. Chem Soc. Chem. Commun.*, 1974, p. 431; and diphenylpyrimidines, as reported by Boller et al., *Z. Natufforsch.*, 1978, vol. 33b, pp. 433–438. An acetylenic moiety, —C≡C—, and a p-phenylene moiety are preferred as the —Y— groups. Suitable —Z substituents are included in the aforementioned papers of Finkelmann and Wu et al.; a preferred —Z substituent is cyano.

A monomeric chiral unit of formula (III) contains an optically active chiral group that includes at least one asymmetric carbon atom and is attached to the acrylic or methacrylic carbonyloxy moiety by a link —Q'—, which is an alkylene radical having either a straight or branched chain and containing one to about seven, preferably about two to six, carbon atoms.

A liquid crystalline copolymer composition of the present invention that includes a chiral unit as described above exhibits selective reflection of visible circular-polarized light of wavelength $\lambda_R$. The selective reflection wavelength $\lambda_R$ can be varied by changes in the structure and concentration of the chiral unit in the liquid crystalline copolymer composition. To achieve liquid crystalline copolymers whose selective reflection wavelengths are in the visible region, it is necessary that the copolymers exhibit adequate helical twisting power. The helical twisting power of a chiral liquid crystalline copolymer can be determined from the slope of the plot of the reciprocal of the selective reflection wavelength $1/\lambda_R$ vs the mole fraction of the chiral component x as x→0 (cf. S. Krishnamurthy and S. H. Chen, *Macromolecules*, 1991, vol. 24, pp. 3481–3484; 1992, vol. 25, pp. 4485–4489). Helical twisting power of chiral nematic liquid crystalline copolymers depends not only on the structure of the chiral units but also on the structure of the nematogenic units, in particular, the extent of the conjugated unsaturation and the length of the flexible link in said units (cf. S. Chen and M. L. Tsai, *Macromolecules*, 1990, vol. 23, pp. 5055–5058).

Many applications of the chiral copolymer compositions of the present invention require a pair of structurally similar polymers capable of forming a right-handed and a left-handed helical structure, which enables them to selectively reflect right-handed and left-handed circular-polarized light, respectively. Using an enantiomeric pair of compounds to form two monomeric chiral units of opposite chirality, which are then copolymerized with one or two common monomeric nematogenic units, provides a pair of copolymers capable of forming right- and left-handed helices. For example, chiral nematic liquid crystalline copolymers containing chiral units prepared from R-(+)- and S-(−)-1-phenylethylamine form helical structures of opposite handedness (cf. M. L. Tsai and S. H. Chen, *Macromolecules*, 1990, vol. 23, pp. 1908–1911).

In accordance with the present invention, optically active compounds preferred for preparing chiral units of formula (III) include the enantiomers of 1-phenylethanol, 1-phenylpropanol, 2-methoxy-2-phenylethanol, mandelic acid methyl ester, α-tetralol, 1-phenylethylamine, 1-cyclohexylethylamine, and 3-amino-ε-caprolactam, Especially preferred are the enantiomeric pairs of 1-phenylethanol and 1-phenylethylamine.

As discussed above, the chiral nematic liquid crystalline polymers of the present invention absorb no light in the visible region but do selectively reflect visible circular-polarized light. They exhibit a helical twisting power sufficient to produce selective reflection wavelengths in the visible region and are capable of forming both right- and left-handed helical structures. Their selectively reflected light is characterized as having a broad half band width (HBW), substantially broader than that obtained with liquid crystalline polymers of the prior art.

In addition to the above-described properties, the chiral nematic liquid crystalline copolymer compositions of the invention exhibit glass transition temperatures $T_g$, at which the copolymers are converted to the liquid crystalline phase, of about 30° C. to 120° C., preferably about 40° C. to 100° C. These compositions are further characterized as having clearing temperatures $T_c$, at which liquid crystalline phases lose long-range order and become isotropic, of about 80° C. to 250° C., preferably about 100° C. to 200° C.

In forming an optical device in accordance with the present invention, a film of a chiral nematic liquid crystalline copolymer composition is applied to a transparent substrate such as glass or fused quartz. The film can be formed from a melt of the copolymer, or it can be formed by applying a solution of the copolymer in a volatile organic solvent to the substrate, followed by drying to remove the solvent. To utilize the latter method for film formation, it is preferred that the copolymer composition be soluble in organic solvents such as methylene chloride, chloroform, tetrahydrofuran, and the like.

The film of chiral nematic liquid crystalline copolymer on the substrate has a thickness of about 0.5 μm to 50 μm, preferably about 5 μm in to 20 μm. Furthermore, the film of copolymer in the liquid crystalline phase is capable of forming and maintaining the Grandjean texture, in which the helical structure of the polymer is perpendicular to the surface of the substrate.

After the film of chiral nematic liquid crystalline copolymer has been applied to a transparent substrate, it is annealed by first heating at a temperature that is above the glass transition temperature but below the clearing temperature of the copolymer, then cooling rapidly to a temperature below the glass transition temperature of the copolymer. In the annealing step, the Grandjean texture is formed in the chiral liquid crystalline polymeric film and is maintained when the film is rapidly cooled below the glass transition temperature. Annealing is suitably performed at a temperature that is about 0.86 to 0.98, preferably about 0.90 to 0.95, of the clearing temperature for a period of about 1 hour to 2 days, preferably about 2 hours to 16 hours.

Procedures for the synthesis of monomeric nematogenic and chiral units and the corresponding chiral liquid crystalline copolymers are described in the previously mentioned paper, *Macromolecules*, 1990, vol. 23, pp. 1908–1911, and in the previously mentioned U.S. Pat. No. 4,293,435, which is incorporated herein by reference.

In Table 1 are shown the formulas of representative chiral nematic liquid crystalline copolymer compositions of the present invention.

TABLE 1

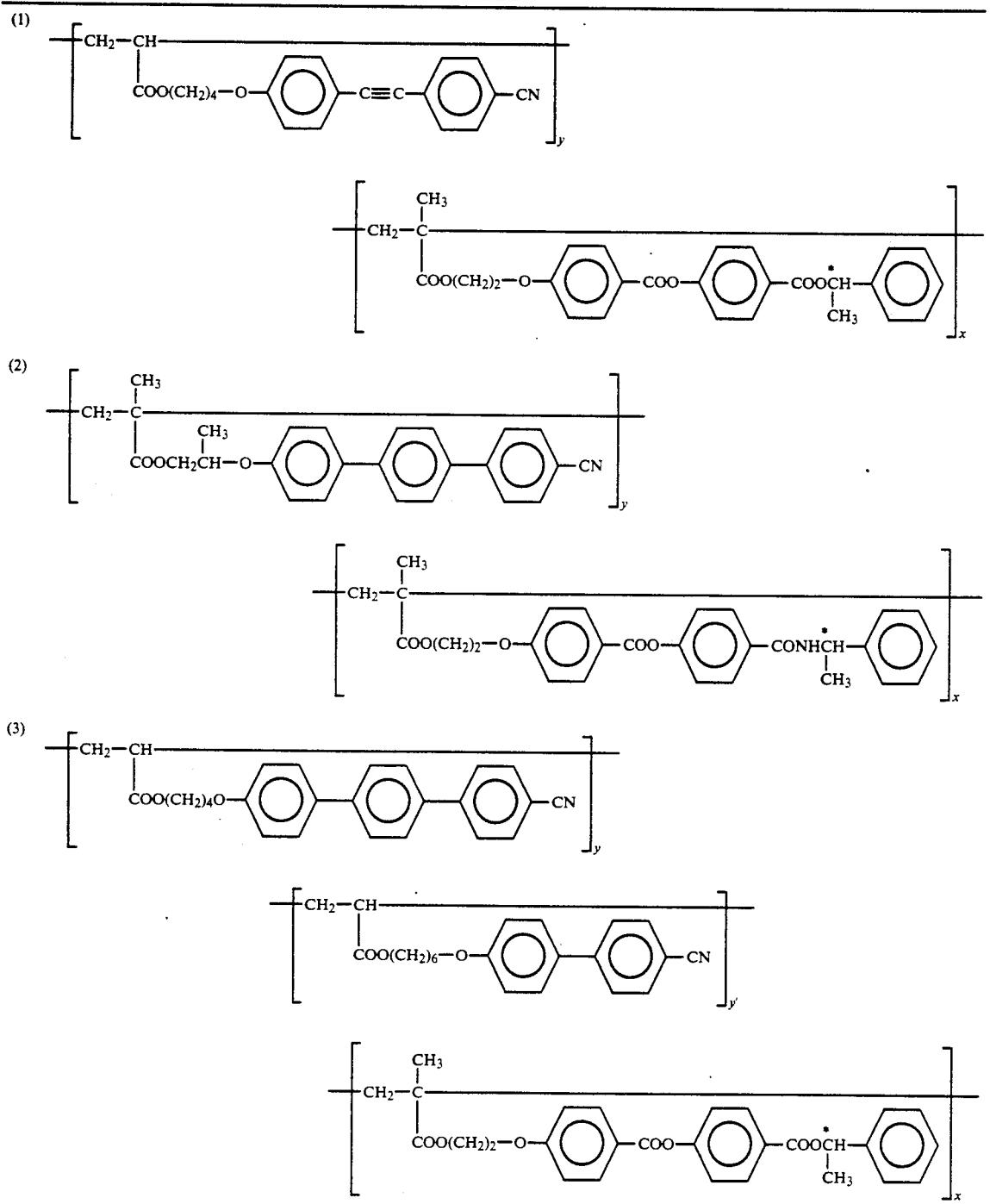

TABLE 1-continued
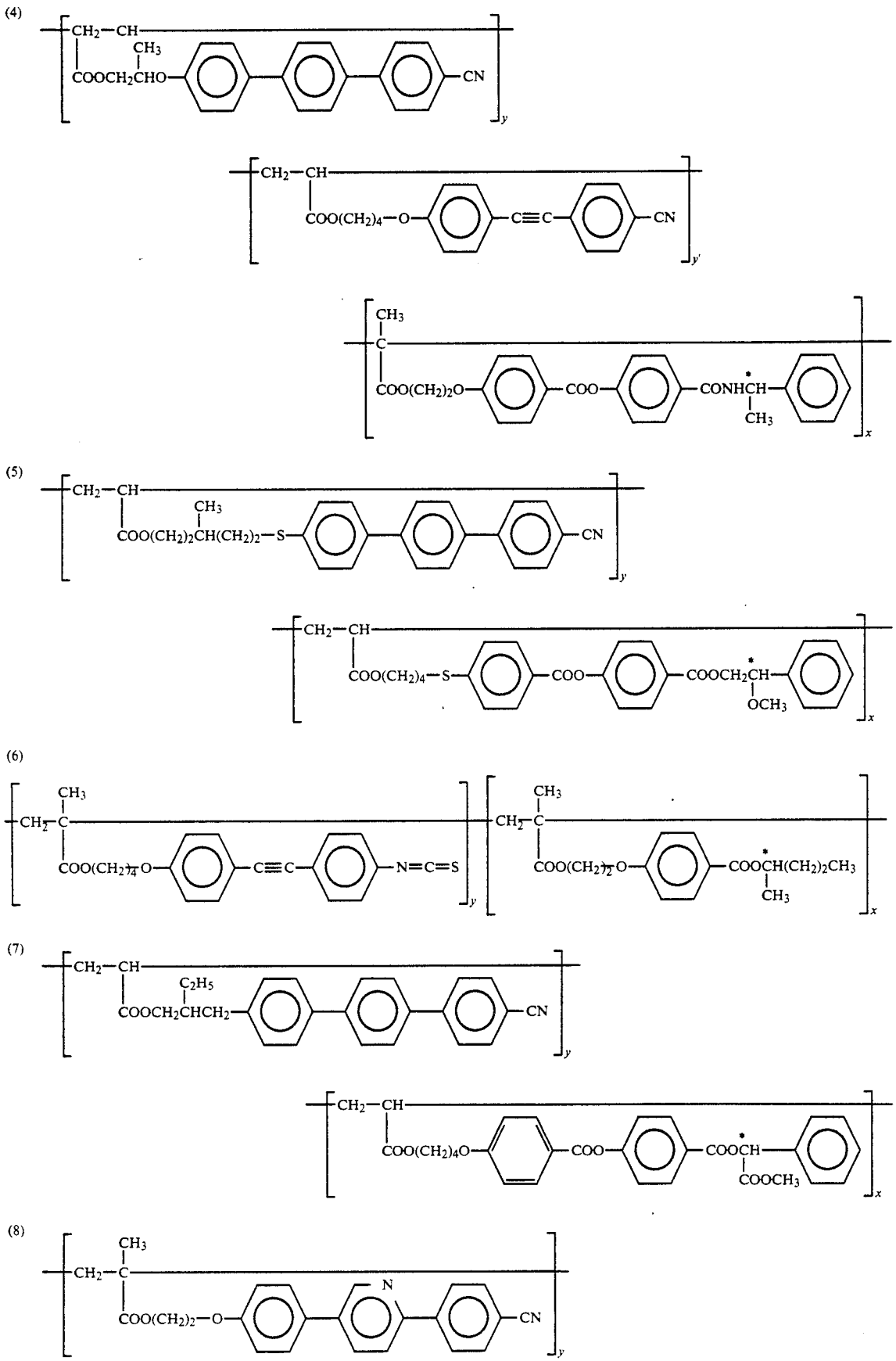

TABLE 1-continued
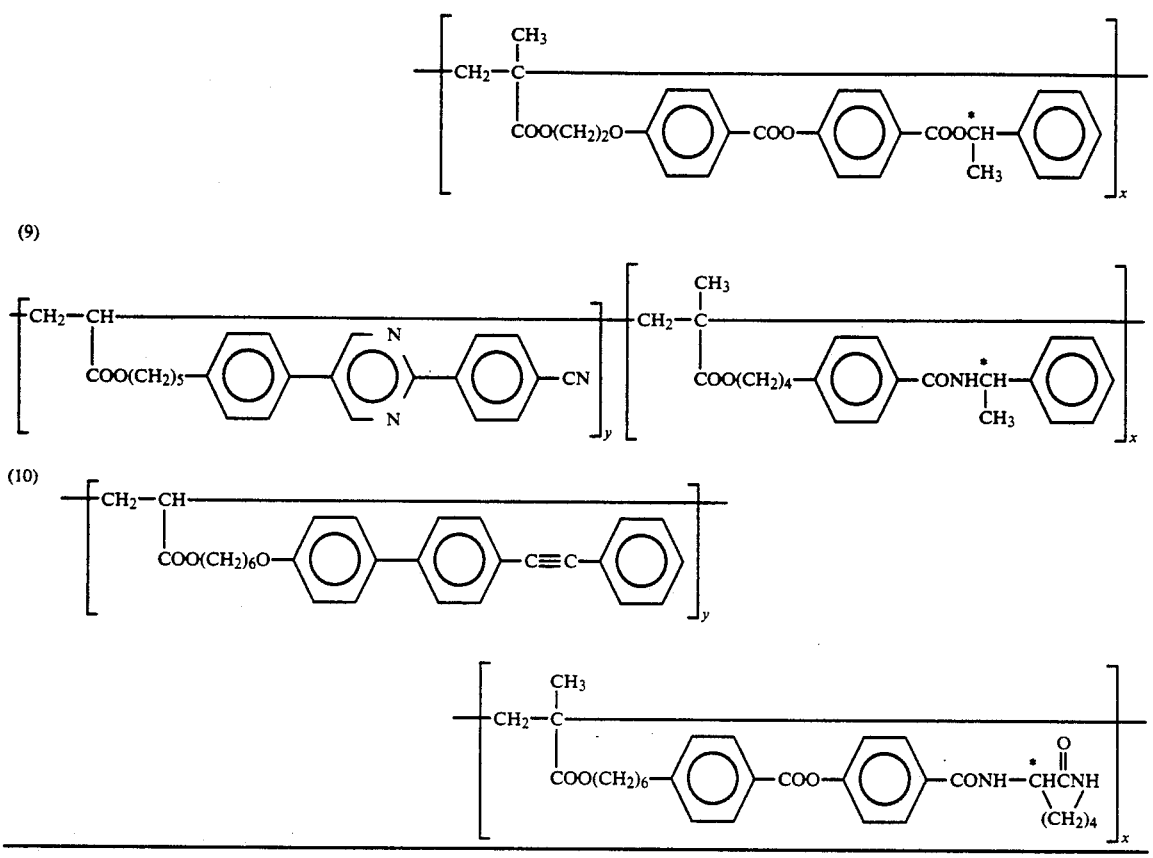
The following examples further illustrate the invention.
EXAMPLE 1
Preparation of Copolymer (1), x=0.08
The nematogenic acrylate monomer
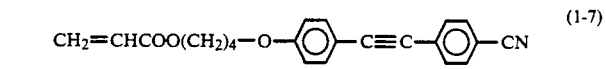
was synthesized by the following reaction scheme:
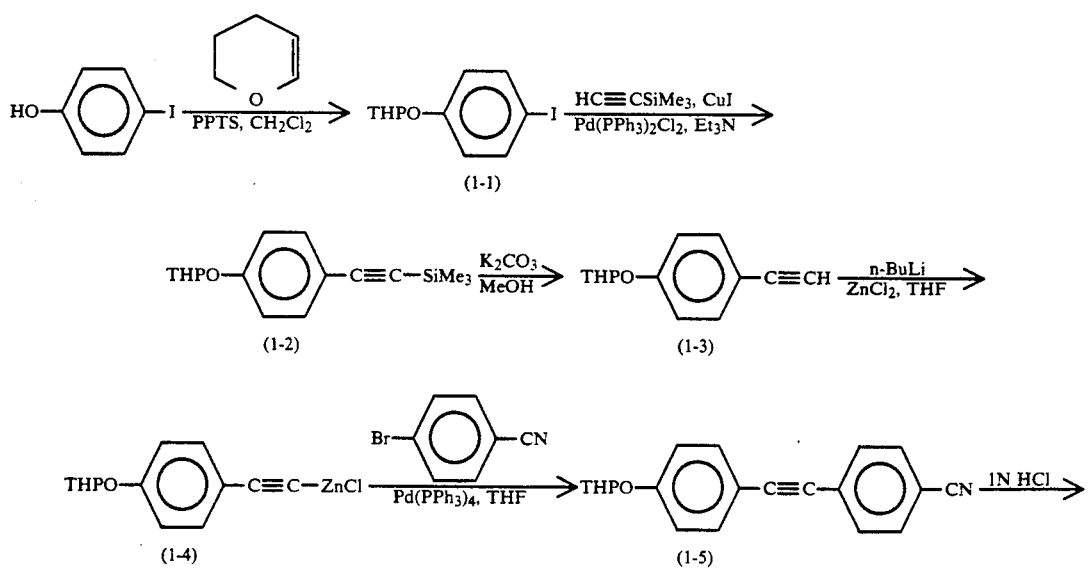

-continued

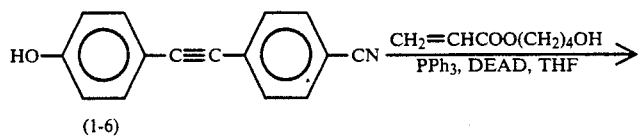

(1-6)

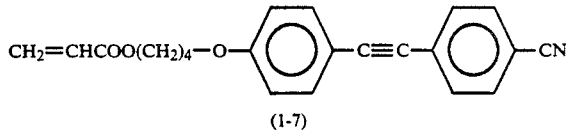

(1-7)

Intermediate (1-1)—A solution of 4-iodophenol (74.4 g) and dihydropyran, DHP, (84.1 g) in 800 ml of dry methylene chloride containing pyridinium p-toluenesulfonate, PTTS, (17.5 g) was stirred at room temperature for 5 hr. Then the solution was diluted with ether and washed several times with half-saturated brine to remove the catalyst. After evaporation of the solvent, the residue was recrystallized to yield white chunky crystals of the tetrahydropyranyl (THP) ether (1-1) (90 g, 85%).

Intermediate (1-2)—To a mixture of (1-1) (25 g) and trimethylsilylacetylene (12 g) in 300 ml of triethylamine were added bis(triphenylphosphine) palladium dichloride (1 g) and copper (I) iodide (0.133 g). The reaction mixture was stirred under nitrogen at room temperature for 3 hr. before the solvent was removed under reduced pressure. The residue was extracted with 500 ml of petroleum ether; the extract was filtered and washed with water and then dried over anhydrous MgSO$_4$. After evaporation of the solvent, the brown crude product was purified by flash chromatography on silica gel, using 1:15 diethyl ether/petroleum ether as the eluent. The pale yellowish product was recrystallized from ethanol to yield white chunky crystals (1-2) (15 g, 66%).

Intermediate (1-3)—5.0 g (1-2) and anhydrous potassium carbonate (1.0 g) were dissolved in 100 ml of methanol and stirred for 2 hr. The solvent was then evaporated, and the residue was dissolved in 200 ml of petroleum ether. The solution was washed with water, dried over anhydrous MgSO$_4$, and evaporated. Recrystallization of the residue from ethanol gave white chunky crystals (1-3) (3.62 g, 98%).

Intermediate (1-4)—To a solution of (1-3) (3.4 g) in 10 ml of anhydrous tetrahydrofuran, THF, at 0° C. was added n-butylithium (0.078 g) in hexane (2M). The solution was stirred for 5 min. prior to addition of anhydrous zinc chloride (2.29 g) dissolved in anhydrous THF (20 ml). The mixture was stirred at room temperature for an additional 15 min.

Intermediates (1-5) and (1-6)—To the solution containing (1-4) cooled to 0° C. were added sequentially a solution of 4-bromobenzonitrile (3.07 g) in anhydrous THF (20 ml) and a solution of tetrakis(triphenylphosphine) palladium (0.5 g) in anhydrous THF (20 ml), both at 0° C., to produce (1-5), which was not isolated. Instead, 30 ml of 1N HCl and 10 g of ammonium chloride were added to form two clearly separated layers, which were stirred at room temperature for another 3 hr. The two layers were separated after shaking with 50 ml of added petroleum ether, and the aqueous portion was extracted with petroleum ether. The organic portions were combined, washed with saturated aqueous sodium bicarbonate solution, and dried over anhydrous MgSO$_4$. After the solvent was evaporated under reduced pressure, the brown residue was purified by flash chromatography on silica gel with methylene chloride as the eluent. The yellowish product was recrystallized from chloroform to give white flakes (1-6) (2.35 g, 64%).

Nematogenic monomer (1-7)—Diethyl azodicarboxylate, DEAD, (1.91 g) in 10 ml of anhydrous THF was added slowly to a mixture containing (1-6) (2.0 g), 4-hydroxybutyl acrylate (1.56 g), triphenylphosphine (2.87 g), and 20 ml of anhydrous THF. The reaction mixture was stirred at room temperature for 5 hr. and then concentrated under reduced pressure. The residue was purified by flash chromatography on silica gel with methylene as the eluent. The crude product was recrystallized from ethanol to give white flakes (1-7) (2.0 g, 64% ).

Chiral monomer (1-8)—The chiral methacrylate monomer (1-8) was synthesized from (S)-(—)-1-phenylethanol by the procedure reported in the previously mentioned *Macromolecules*, 1991, Vol. 24, pp. 3481-3484.

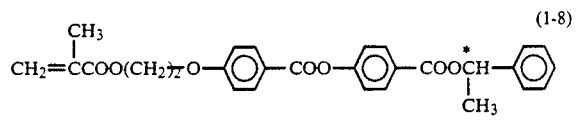

(1-8)

Copolymer (1), x=0.08—The nematogenic monomer (1-7) (0.433 g), the chiral monomer (1-8) (0.0530 g), and 2,2'-azobis(isobutyronitrile), AIBN, (1 mg) were dissolved in anhydrous THF ( 1.5 ml). The reaction mixture was stirred under nitrogen at 60° C. for 2 days. The copolymer product was isolated and purified by repeated dissolution-precipitation cycles, using methanol as the nonsolvent, and dried under vacuum. The copolymer (1) had a weight-avenge molecular weight of 13,600, with a polydispersity index of 2.0. The chiral mole fraction, x, was determined to be 0.08 by proton NMR spectroscopy. The differential scanning calorimetry (DSC) thermogram showed a glass transition temperature, $T_g$, at 44° C. and a cholesteric to isotropic transition, or clearing temperature, $T_c$, at 106° C., the cholesteric mesophase being identified by polarized optical microscopy.

EXAMPLE 2

Preparation of Copolymer (2), x=0.10

The nematogenic methacrylate monomer

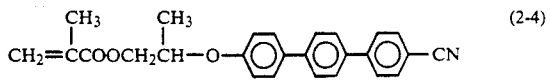

(2-4)

was synthesized by the following scheme:

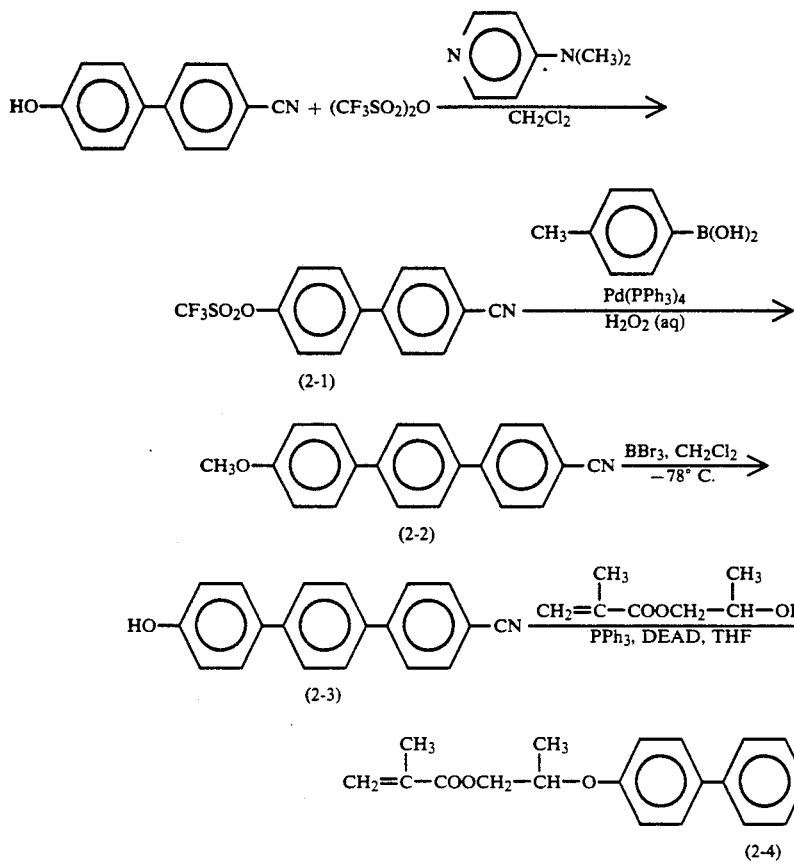

Intermediate (2-1)—4-Hydroxy-4-cyanobiphenyl (10 g) and 4-dimethylaminopyridine (20 g) were dissolved in anhydrous methylene chloride (200 ml); the solution was kept at 0° C. while triflic anhydride (15 g) was added dropwise over a period of ½ hr. The mixture was then shaken twice with 1N HCl (250 ml each) in a separatory funnel. The organic layer was separated and evaporated, and the residue was then flash chromatographed on silica gel with methylene chloride as the eluent to obtain a white crystalline powder (2-1) (15.5 g, 92%).

Intermediate (2-2)—Tetrakis(triphenylphosphine) palladium (1.79 g) and (2-1) (10.55 g) were mixed with 200 ml of benzene and 100 ml of 2M aqueous sodium carbonate. The mixture was stirred vigorously, and 4-methoxybenzeneboronic acid (5.64 g) in 20 ml of methanol and 40 ml of benzene was added. The mixture was heated under reflux for 2.5 hr.; after cooling to room temperature, 0.5 ml of a 30% aqueous solution of $H_2O_2$ was added. The rust colored solid was collected by filtration, and the filtrate was shaken with an aqueous solution of sodium carbonate (2M). The organic layer was dried over anhydrous $Na_2SO_4$, and the solvent was evaporated under reduced pressure to give a dark red tar, which was combined with the solid obtained above and subjected to flash chromatography on silica gel with methylene chloride as the eluent. Recrystallization from 1:1 acetone/methylene chloride was accomplished to give a granular white solid (2-2)(7.51 g, 82%).

Intermediate (2-3)—(2-2) (6.8 g) was dissolved in 200 ml of anhydrous methylene chloride, and the clear solution was kept at −78° C. while 50 ml of a solution of boron tribromide in methylene chloride (1M) was added, which resulted in a tan slurry. The reaction mixture was allowed to warm to room temperature before a small amount of fluffy precipitate was removed by filtration. The filtrate was cooled in an ice bath, and 200 ml water was added to produce a solid, which was collected by filtration and further washed with water. The solid product was dried, then stirred in boiling 20:1 methylene chloride/acetone mixture for a few minutes. The mixture was allowed to cool, and the solid was again collected and dried, yielding a tan powder (2-3) (6 g, 93%).

Nematogenic monomer (2-4)—Triphenylphosphine (2.42 g) and (2-3) (2.42 g) were mixed with 100 ml of anhydrous THF to form a milky slurry, to which 2-hydroxypropyl methacrylate (1.30 g) in 50 ml of anhydrous THF was added. Diethyl azodicarboxylate, DEAD, (1.63 g) in 40 ml of anhydrous THF was slowly added to the slurry to produce a clear solution; the reaction was then left to proceed overnight. The volume of the solution was reduced via evaporation, and the concentrate was shaken with a methylene chloride and water mixture (100 ml each). The organic layer was washed with water (3×100 ml), and the aqueous layer was extracted with methylene chloride (2×25 ml). The combined organic portions were dried over anhydrous $Na_2SO_4$, and the crude product was isolated by evaporating the solvent. Flash chromatography on silica gel with methylene chloride as the eluent gave monomer (2-4) as a white solid (0.98 g, 28%).

Chiral monomer (2-5)—The chiral methacrylate monomer (2-5) was synthesized from (S)-(−)-1-phenylethylamine by the procedure reported in the previously mentioned *Macromolecules*, 1990, vol. 23, pp. 1908–1911.

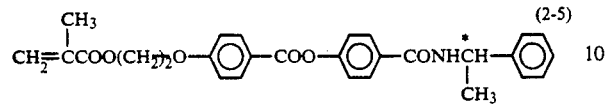

(2-5)

Copolymer (2), x=0.10—The nematogenic monomer (2-4) (0.25 g), the chiral monomer (2-5) (0.03 g), and 2,2′-azobisisobutyronitrile, AIBN, (1 mg) were dissolved in anhydrous THF (10 ml). The reaction mixture was stirred at 60° C. under nitrogen for 3 days. The product was isolated by precipitation in methanol and purified with repeated dissolution-precipitation cycles to yield copolymer (2) (0.12 g, 40%), x=0.10. The weight-average molecular weight was determined to be 3,960, with a polydispersity index of 1.7. A vacuum dried sample showed a $T_g$ at 69° C. and a $T_c$ at 144° C., the cholesteric mesophase being identified by polarized optical microscopy.

EXAMPLE 3

Preparation of Copolymer (3), x=0.15, y=0.50, y′=0.35

Nematogenic monomer (3-1)—The terphenylsubstituted nematogenic acrylate monomer

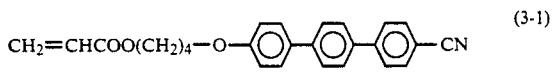

(3-1)

was prepared from the cyanohydroxyterphenyl compound (intermediate (2-3) of Example 2) (2.45 g), 4-hydroxybutyl acrylate (1.10 g), triphenylphosphine (2.37 g), and diethyl azodicarboxylate (1.62 g) in tetrahydrofuran, following the procedure used to make monomer (2-4) of Example 2. The crude product was purified by flash chromatography, then recrystallized from 3:1 methanol:acetone to give monomer (3-1) as a white solid (2.04 g, 67%).

Nematogenic monomer (3-2)—The biphenylsubstituted nematogenic acrylate monomer

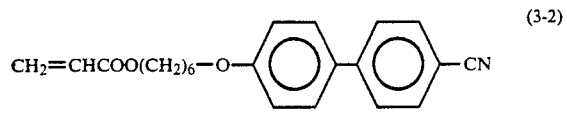

(3-2)

was prepared by the following reaction scheme:

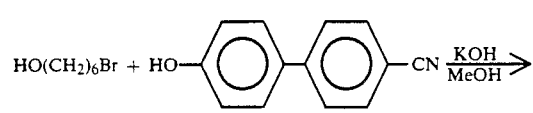

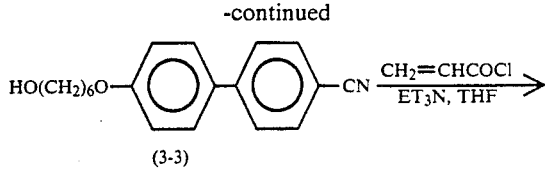

(3-3)

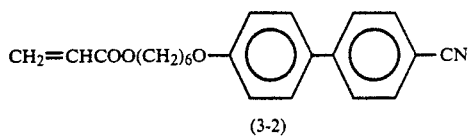

(3-2)

Intermediate (3-3)—A solution of 4-hydroxy-4′-cyanobiphenyl (5.03 g) and potassium hydroxide (1.73 g) in 30 ml of methanol was heated to reflux, and a solution of 6-bromohexanol (5.15 g) in 11 ml of methanol was added. The mixture was allowed to cool to room temperature, then treated with 100 ml of chloroform and 100 ml of water. The chloroform layer was separated, and the aqueous phase was extracted with chloroform. The chloroform solutions were combined, dried over anhydrous $Na_2SO_4$, and evaporated. The residue was recrystallized from acetone and further purified by flash chromatography on silica gel using 10:1 methylene chloride:methanol to give (3-3) (4.17 g, 55%).

Nematogenic monomer (3-2)—To a solution of (3-3) (4.94 g) and triethylamine (2.02 g) in 15 ml of dry THF was added dropwise a solution of acryloyl chloride (1.65 g) in 10 ml of dry THF. To the mixture was added 75 ml each of methylene chloride and water. The organic layer was dried over anhydrous $Na_2SO_4$ and evaporated to dryness. The residue was purified by flash chromatography on silica gel with methylene chloride, followed by recrystallization to yield the monomer (3-2) as shiny white crystals (4.11 g, 70%).

Copolymer (3), x=0.15, y=0.50, y′=0.35

The nematogenic monomer (3-1) (0.200 g), the nematogenic monomer (3-2) (0.124 g), and the chiral monomer (2-5 of Example 2) (0.72 g), and 2,2′-azobisisobutyronitrile (1 mg) were dissolved in 4 ml of anhydrous THF. The mixture was stirred at 60° C. under nitrogen for 3 days. The product was then isolated by precipitation in methanol and purified with repeated dissolution—precipitation cycles to yield copolymer (3) (0.355 g, 90%). The dried copolymer had a weight-average molecular weight of 7,270, with a polydispersity index of 2.0. The DSC thermogram showed a glass transition temperature, $T_g$, at 48° C. and a clearing temperature, $T_c$, at 163° C., the mesophase being identified by polarized optical microscopy.

EXAMPLE 4

Formation of Optical Devices

Optical devices were prepared from copolymers (1), (2), and (3) of the invention and from the prior art copolymer (C-1) of the previously mentioned U.S. Pat. No. 4,293,435 and *Macromolecules*, 1991, vol. 24, pp. 3481–3484.

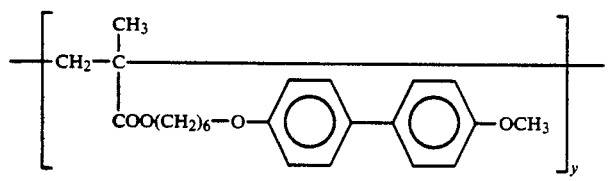

(C-1)

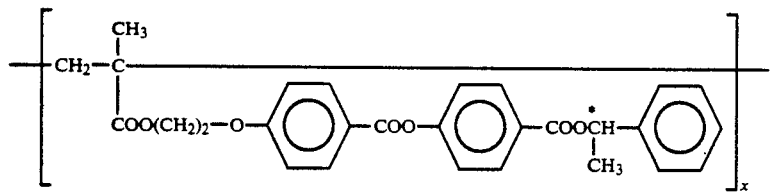

Approximately 20 mg of each copolymer was placed between a pair of soda lime glass substrates (50 mm in diameter and 1.6 mm thick) separated by 13 μm-thick Kapton ® (from DuPont) spacers. Each element was annealed for approximately 12 hours at a temperature that was about 0.95 of the clearing temperature of the copolymer, then rapidly cooled to room temperature. The selective reflection wavelength $\lambda_R$ and half band width HBW, as previously defined, were determined for each of the elements, using a Perkin-Elmer Lambda 9 UV-visible-near IR spectrophotometer. Half band width values $(HBW)_{588}$ corresponding to an $\lambda_R$ value of 588 nm were also calculated for several of the elements, using the procedure described in J. L. Fergason, Mol. Cryst., 1966, Vol. 1, pp. 293–307; P. V. Adomenas et al., Opt. Spectroscopy (USSR), 1983, Vol. 54, pp. 179–182. The results are shown in Table 2.

TABLE 2

| Element | Copolymer | $\lambda_R$ | HBW | $(HBW)_{588}$ |
|---|---|---|---|---|
| 1 control | (C-1) | 543 nm | 105 nm | 114 nm |
| 2 invention | (1) | 588 nm | 140 nm | 140 nm |
| 3 invention | (2) | 644 nm | 166 nm | 152 nm |
| 4 invention | (3) | 583 nm | 143 nm | 144 nm |

The data of Table 2 clearly demonstrate the desirable broadening of the spectral reflection bands, as manifested in the HBW and $(HBW)_{588}$ values, for the chiral nematic liquid crystalline copolymers (1), (2), and (3) of the present invention compared with the prior art copolymer (C-1).

Although the invention has been described in detail for the purpose of illustration, it is understood that such detail is solely for that purpose, and variations can be made therein by those skilled in the art without departing from the spirit and scope of the invention that is defined by the following claims.

What is claimed is:

1. A chiral nematic liquid crystalline copolymer composition comprised of the repeating units of formula

wherein —NEM— and —NEM'— are each independently nematogenic units of formula

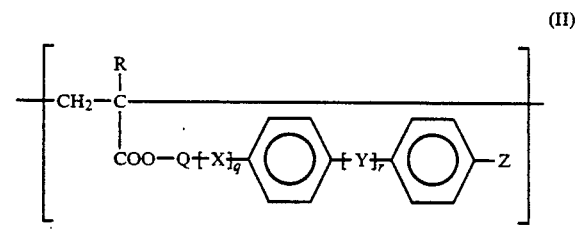

(II)

wherein R is H or CH3,

—Q— is an alkylene radical having 1 to about 8 carbon atoms,

—X— is —O—, —S—, or —CH2—,

—Y— is

—Z is —CN, —NO2, or —N=C=S, q and r are each independently 0 or 1;

wherein —CHI— is a chiral unit of formula

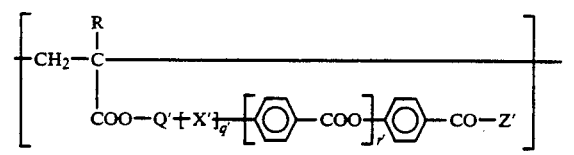

(III)

wherein R is H or CH3,

—Q'— is an alkylene radical having 1 to about 8 carbon atoms,

—X'— is —O—, —S—, or —CH2—,

—Z' is an alkoxy, aralkoxy, alkylamino, or aralkylamino radical having 4 to about 12 carbon atoms and containing at least one asymmetric carbon atom, q' and r' are each independently 0 or 1;

and wherein x is the mole fraction of chiral units, and (y+y') is the total mole fraction of nematogenic units in said copolymer composition, and the ratio of x to (y+y') is from about 1:50 to 1:1.

2. A composition of claim 1 wherein said ratio of x to (y+y') is from about 1:20 to 1:3.

3. A composition of claim 1 wherein said copolymer composition has a weight average molecular weight of about 1,500 to 50,000.

4. A composition of claim 3 wherein said weight average molecular weight is about 2,000 to 20,000.

5. A composition of claim 1 wherein —X— is —O—, —Y— is —C≡C— or p-phenylene, and q and r are each 1.

6. A composition of claim 5 wherein Q contains 3 to 6 carbon atoms and —Z is —CN.

7. A composition of claim 1 wherein —Z' is an alkoxy or aralkoxy radical derived from an alcohol.

8. A composition of claim 7 wherein said alcohol is 1-phenylethanol, 2-methoxy-2-phenylethanol, or mandelic acid methyl ester.

9. A composition of claim 1 wherein —Z' is an alkylamino or aralkylamino radical derived from an amine.

10. A composition of claim 9 wherein said amine is 1-phenylethylamine, 1-cyclohexylethylamine, or 3-amino-ε-caprolactam.

11. A composition of claim 1 wherein said chiral unit —CHI— has the formula

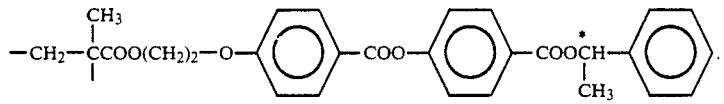

12. A composition of claim 1 wherein said chiral unit —CHI— has the formula

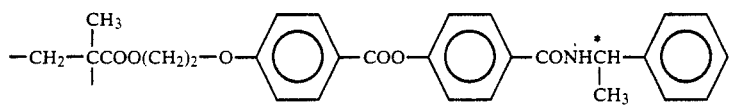

13. A composition of claim 1 wherein said nematogenic unit —NEM— has the formula

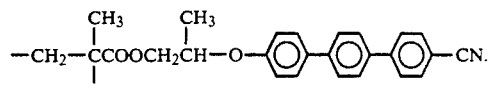

14. A composition of claim 1 wherein said nematogenic unit —NEM— has the formula

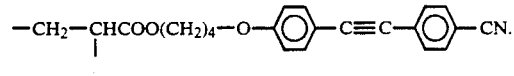

15. A composition of claim 1 wherein said nematogenic unit —NEM— has the formula

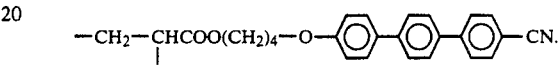

16. A composition of claim 1 having the formula

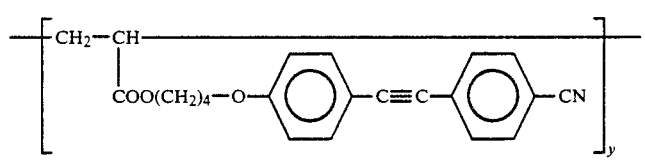

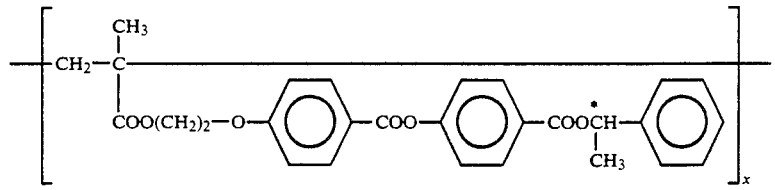

17. A composition of claim 1 having the formula

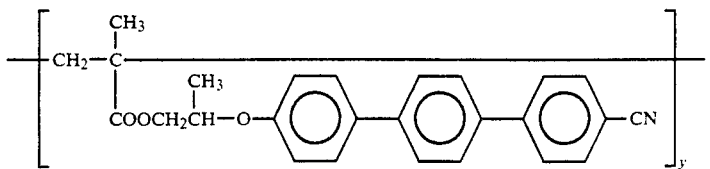

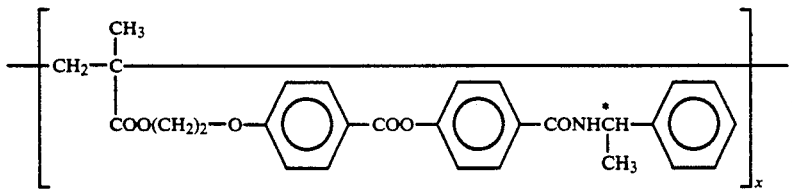

18. A composition of claim 1 having the formula

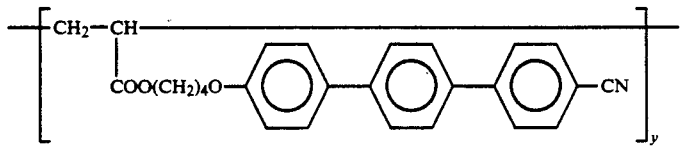

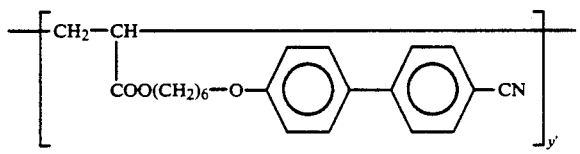

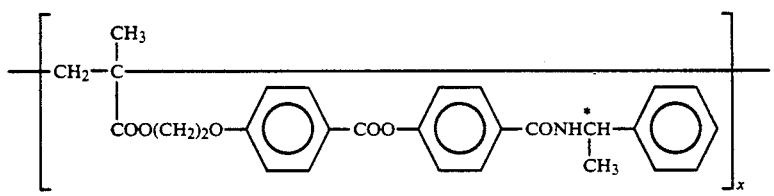

19. An optical device comprising an optically transparent substrate and a film formed from a chiral nematic liquid crystalline copolymer composition comprised of the repeating units of the formula

         (I)

wherein —NEM— and —NEM'— are each independently nematogenic units of formula

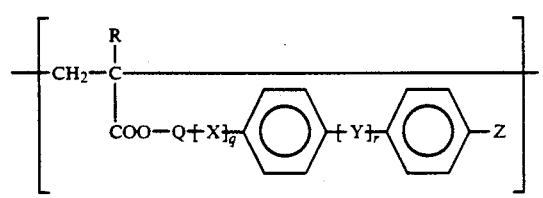         (II)

wherein R is H or CH$_3$,

—Q— is an alkylene radical having 1 to about 8 carbon atoms,

—X— is —O—, —S—, or —CH$_2$—,

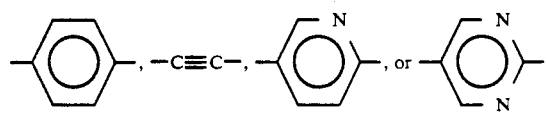

—Z is —CN, —NO$_2$, or —N=C=S, q and r are each independently 0 or 1;

wherein —CHI— is a chiral unit of formula

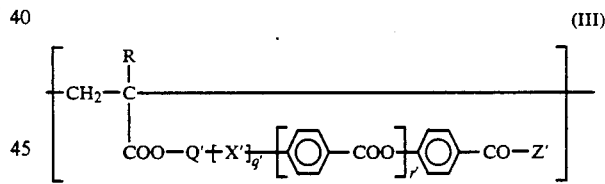         (III)

wherein R is H or CH$_3$,

—Q'— is an alkylene radical having 1 to about 8 carbon atoms,

—X'— is —O—, —S', or —CH$_2$—,

—Z' is an alkoxy, aralkoxy, alkylamino, or aralkylamino radical having 4 to about 12 carbon atoms and containing at least one asymmetric carbon atom, q' and r' are each independently 0 or 1;

and wherein x is the mole fraction of chiral units and (y+y') is the total mole fraction of nematogenic units in said copolymer composition, and the ratio of x to (y+y') is from about 1:50 to 1:1.

20. An optical device of claim 19 wherein said substrate is glass or fused quartz.

21. An optical device of claim 19 wherein said film has a thickness of about 0.5 μm to 50 μm.

22. An optical device of claim 21 wherein said thickness is about 5 μm to 20 μm.

23. An optical device of claim 19 wherein said copolymer composition has the formula

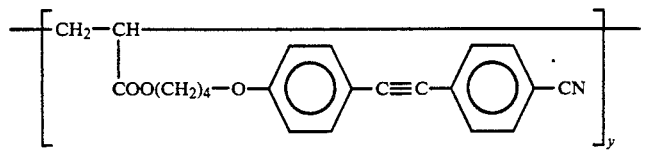
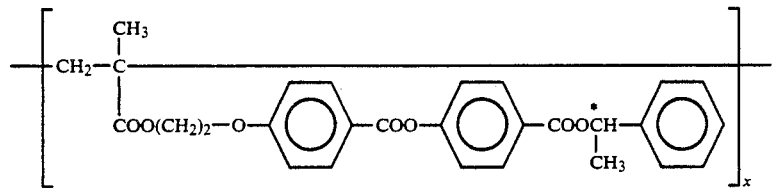
24. An optical device of claim 19 wherein said copolymer composition has the formula
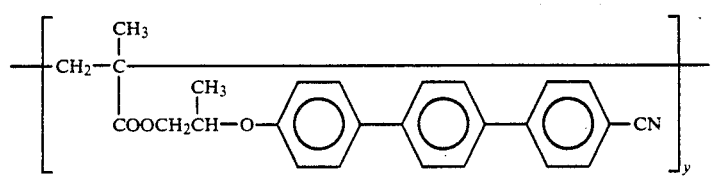
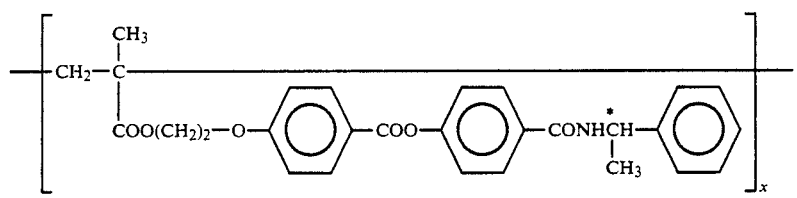
25. An optical device of claim 19 wherein said copolymer composition has the formula
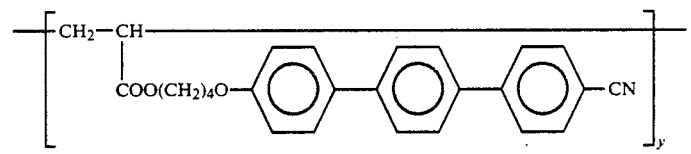
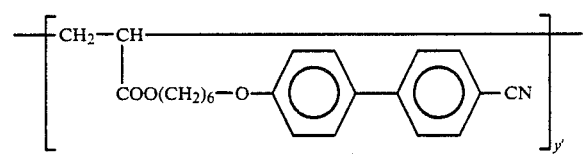
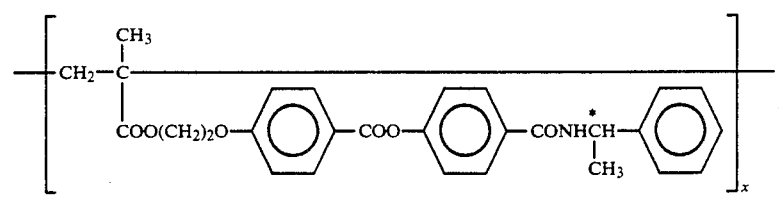
* * * * *